UNITED STATES PATENT OFFICE.

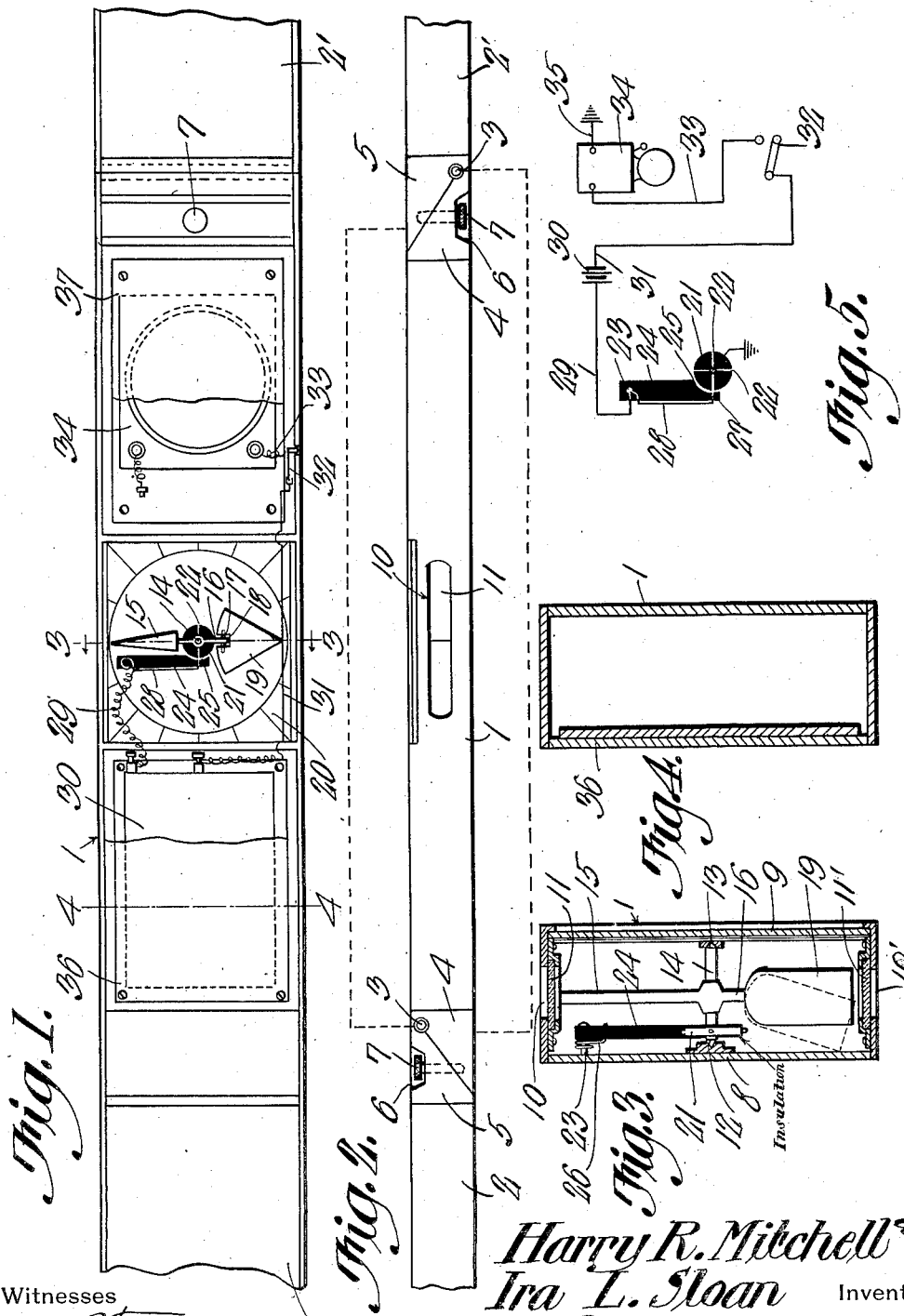

HARRY R. MITCHELL AND IRA L. SLOAN, OF SEATTLE, WASHINGTON.

LEVEL.

1,058,320.　　　　　Specification of Letters Patent.　　　Patented Apr. 8, 1913.

Application filed April 1, 1912. Serial No. 687,794.

*To all whom it may concern:*

Be it known that we, HARRY R. MITCHELL and IRA L. SLOAN, citizens of the United States, residing at Seattle, in the county of King, State of Washington, have invented a new and useful Level, of which the following is a specification.

The present invention relates to improvements in levels, the primary object of the invention being the provision of a novel form of what is commonly known as a spirit level in which in lieu of the usual form of spirit containing receptacle, a pivotally mounted plumb bob or weight actuated indicator or pointer is employed to visually indicate, while in co-active relation therewith is a switch connected in an electrical circuit including an audible alarm, whereby the alarm is energized to audibly indicate when the level is in the desired horizontal or perpendicular position.

A further object of the present invention is the provision of a folding level, the central member of which forms a compartment for the reception of a centrally disposed plumb bob indicator mechanism, a battery and an audible alarm, a cut-off switch being also disposed in the circuit and operable exteriorly of the level for placing the circuit into open or closed condition.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of the central portion of the level, with the covers for the battery and alarm receptacles partially removed, portions of the extensions being shown in extended position. Fig. 2 is a top plan view of the level, the extensions being shown in dotted lines as folded. Fig. 3 is a section taken on line 3—3 of Fig. 1. Fig. 4 is a section taken on line 4—4 of Fig. 1. Fig. 5 is a diagrammatic view of the electrical circuit used in connection with this level.

Referring to the drawings, the numeral 1 designates the central or main section of the level while 2 and 2′ designate the folding end sections which are hingedly connected with the respective ends of the main section 1 by means of the hinge joints 3, the plates 4 and 5 being disposed transversely of the respective ends of the section 1 and sections 2 and 2′ and composed of metal. The plate 4 or 5 as clearly shown is provided with the transverse groove 6, and in order to lock the extensions in extended position and permit the same to be folded to assume the dotted line position Fig. 2, the set screws 7 are employed, the recesses 6 providing a means whereby the heads of said screws are positioned below the outer surface of the level and provide a connection without any projection beyond the face of the level.

The wall 8 and the transparent sheet 9 constitute the front and rear walls of the indicator compartment of the level, while formed in the top and bottom of the level are the apertures 10 and 10′ respectively, which are closed by the strips 11 and 11′ of glass to permit the indicator to be observed.

The two journal lugs 12 and 13 carried by the respective walls 8 and 9 provide a support for the arbor 14 which carries the indicating pointer 15 and the arm 16. The transversely disposed pin 17 forms a pivotal connection with the lower end of the arm 16 and the weight of plumb bob 19, the plumb bob being provided with a recess 18 into which the lower end of the arm 16 projects as clearly shown in Fig. 1. By this means the visual indicator 15 is actuated to coöperate with the degree dial 20 to visually indicate the angle of indication of the pointer 15.

Keyed upon and rotatable with the arbor 14 is a disk 21 made of insulation, the same having embedded therein and connected to the arbor 14, the four metal conducting plates 22, which extend from the periphery of the disk to the arbor 14 at an angle of 90° with relation to each other and constitute a portion of the electrical audible alarm actuating circuit, as will presently appear.

The pin 23 is carried by the wall 8 of the level and has mounted thereon the arm 24 of insulation. The arm 24 is provided with the cut-away portion 25 which is of such a contour as to correspond with the contour or periphery of the disk 21. A spring 26 mounted upon the pin 23 is so connected with relation to the arm 24 as to hold the curved portion 25 thereof into sliding contact with the periphery of the disk 21, so that the contact point 27 carried by the arm 24 will be placed into contact with the respective outer ends of the conductors 22, so as to complete an electrical circuit, as will presently appear.

Leading from the contact 27 is a conductor plate 28 carried by the arm 24, and connected to said contact plate 28 is a conductor 29 which is connected at one side with a battery 30 which is disposed within the battery compartment of the level. The conductor 31 leads from the other side of the battery to the knife switch 32 which is so positioned in the level as to be readily accessible so that the electrical circuit may be connected or disconnected as desired. Leading from the knife switch 32 is a conductor 33 which is connected to one post of the buzzer or audible alarm 34 mounted in the level on the opposite side of the indicating compartment to the battery 30, the conductor 35 leading from the other post of the audible alarm 34 being grounded with the level so that the circuit is completed through the middle section of the level and arbor 14. This circuit is clearly shown in diagram in Fig. 5.

In order that the battery 30 may be renewed, the removable cover 36 is provided for the compartment of the level containing the battery and in order that the buzzer may be made accessible, the cover 37 is provided.

From the foregoing description, taken in connection with the drawings, it is evident that the level when placed in a horizontal plane and the knife switch 32 is closed, that the plumb bob will rotate the arbor 14 to assume the position as shown in Fig. 1, wherein one of the conductors 22 are brought into electrical connection with the contact point 27, thus establishing a circuit to energize the buzzer so as to indicate audibly that the surface is level. Should it be desired to plumb a perpendicular surface, the level will be turned at right angles to the position shown in Fig. 1, so that the plumb bob will assume the position to bring one of the conductors 22 into electrical engagement with the contact 27, and thus energize the circuit to actuate the audible alarm. By this form of device, the level may be operated in places where it is impractical to use the ordinary form of spirit level and the very instant that the level is brought to a horizontal or perpendicular plane, the electrical circuit will be closed and an audible alarm given.

By reason of the pivoting of the plumb bob or weight 19, with the arm 16 of the indicator, the actuation of the arbor will be halted when the level is out of use and lying upon its side, as the weight will swing toward either wall 8 or 9, and thus engage the same to assume the dotted line position of Fig. 3, and thus act as a brake means to prevent the twirling of the arbor. By reason of the knife switch 32, the same may be operated to open the circuit when the level is not in use and thus avoid the possibility of the battery being wasted by contact at 22 and 27.

What is claimed is:

1. A level having a main portion provided with a receptacle, an arbor carrying an indicator disposed therein, a weight connected at one end of the indicator, a source of electrical energy, a circuit connected therewith, an audible alarm in said circuit, a plurality of contacts carried by and rotatable with the arbor, and a contact disposed in the path of the plurality of contacts to coact with either one of said contacts to close the circuit when the level is in a horizontal or vertical position.

2. A level having a main portion provided with a receptacle, an arbor carrying an indicator disposed therein, a weight connected to one end of the indicator, a source of electrical energy, a circuit connected therewith, an audible alarm in said circuit, a plurality of contacts carried by and rotatable with the arbor, a contact disposed in the path of the plurality of contacts to coact with either one of said contacts to close the circuit when the level is in a horizontal or vertical position, and a manually operated switch accessible from the exterior of the level and connected in said circuit.

3. A level, having a main section provided with a receptacle, an arbor mounted in said receptacle, a visual indicator carried thereby, and overbalancing means pivotally connected to the indicator, said overbalancing means being pivoted for swinging movement at right angles to the movement of the arbor, a source of electrical energy, a circuit including said source, an audible alarm in said circuit, and coöperable contacts in said circuit and carried by the arbor and in the path thereof, whereby when the level is in a horizontal or vertical position the electrical circuit will be closed.

4. A level, having a main section provided with a receptacle, an arbor mounted in said receptacle, a visual indicator carried thereby, and overbalancing means pivotally connected to the indicator, said overbalancing means being pivoted for swinging movement at right angles to the movement of the arbor, a source of electrical energy, a circuit including said source, an audible alarm in said circuit, coöperable contacts in said circuit and carried by the arbor and in the path thereof, and a manually operated switch accessible exteriorly of the level, whereby when the switch is closed and the level is in a horizontal or vertical position the electrical circuit will be closed.

5. A level, having a main section provided with a receptacle, an arbor journaled for rotation in said receptacle, an indicating pointer carried thereby, an overbalancing means pivotally connected to the pointer at the non-pointing end thereof; and capable of a swinging movement at right angles to the movement of the arbor, a source of electrical energy, a circuit including said source, an audible alarm in said circuit, a disk of insulation connected to and rotatable with the arbor, a plurality of contacts carried by said disk of insulation, and a coacting contact in said circuit disposed in the path to engage either one of the contacts of the disk to close the circuit when the level is in a horizontal or vertical position.

6. A level, having a main section provided with a receptacle, an arbor journaled for rotation in said receptacle, an indicating pointer carried thereby, an overbalancing means pivotally connected to the non-pointing end of the pointer and capable of a swinging movement at right angles to the movement of the arbor, a source of electrical energy, a circuit including said source, an audible alarm in said circuit, a disk of insulation connected to and rotatable with the arbor, a plurality of contacts carried by said disk of insulation, a coacting contact in said circuit disposed in the path to engage either one of the contacts of the disk to close the circuit when the level is in a horizontal or vertical position, and a manually operated switch accessible from the exterior of the level connected in said circuit.

7. A level, having a rotating arbor, an indicator carried by the arbor, a circuit including a source of electrical energy, an audible alarm in said circuit, a disk of insulation provided with a plurality of metal contacts carried by the arbor and mounted in said circuit, and another contact in said circuit disposed for coaction with one of the contacts at a time to close the circuit when the level is in a horizontal or vertical position.

8. A level, having a rotating arbor, a visual indicator carried by the arbor, a circuit including a source of electrical energy, an audible alarm in said circuit, a disk of insulation provided with a plurality of metal contacts, carried by the arbor and connected in said circuit, another contact in said circuit disposed for coaction with one of the contacts at a time to close the circuit when the level is in a horizontal or vertical position, and a manually operated switch accessible from the exterior of the level and connected in said circuit.

9. A level, having a rotating arbor, a visual indicator carried thereby, a source of electrical energy, a circuit including said source, an audible alarm in said circuit, a disk of insulation provided with a plurality of metal contacts carried by the arbor and mounted in said circuit, another contact in said circuit disposed for coaction with one of the arbor carried contacts at a time to close the circuit when the level is in a horizontal or vertical position, and an overbalancing weight for the visual indicator mounted to swing at right angles to the direction of rotation of the arbor.

In testimony that we claim the foregoing as our own, we have hereto affixed our signatures in the presence of two witnesses.

HARRY R. MITCHELL.
IRA L. SLOAN.

Witnesses as to signature of Harry R. Mitchell:
    WM. MAXWELL,
    F. E. WHITE.

Witnesses as to signature of Ira L. Sloan:
    JAMES O. CULL,
    RAY CAVALIN.